W. H. HOLBY.
MECHANICAL GEAR SHIFT.
APPLICATION FILED AUG. 18, 1915.
1,181,887.
Patented May 2, 1916.
4 SHEETS—SHEET 1.
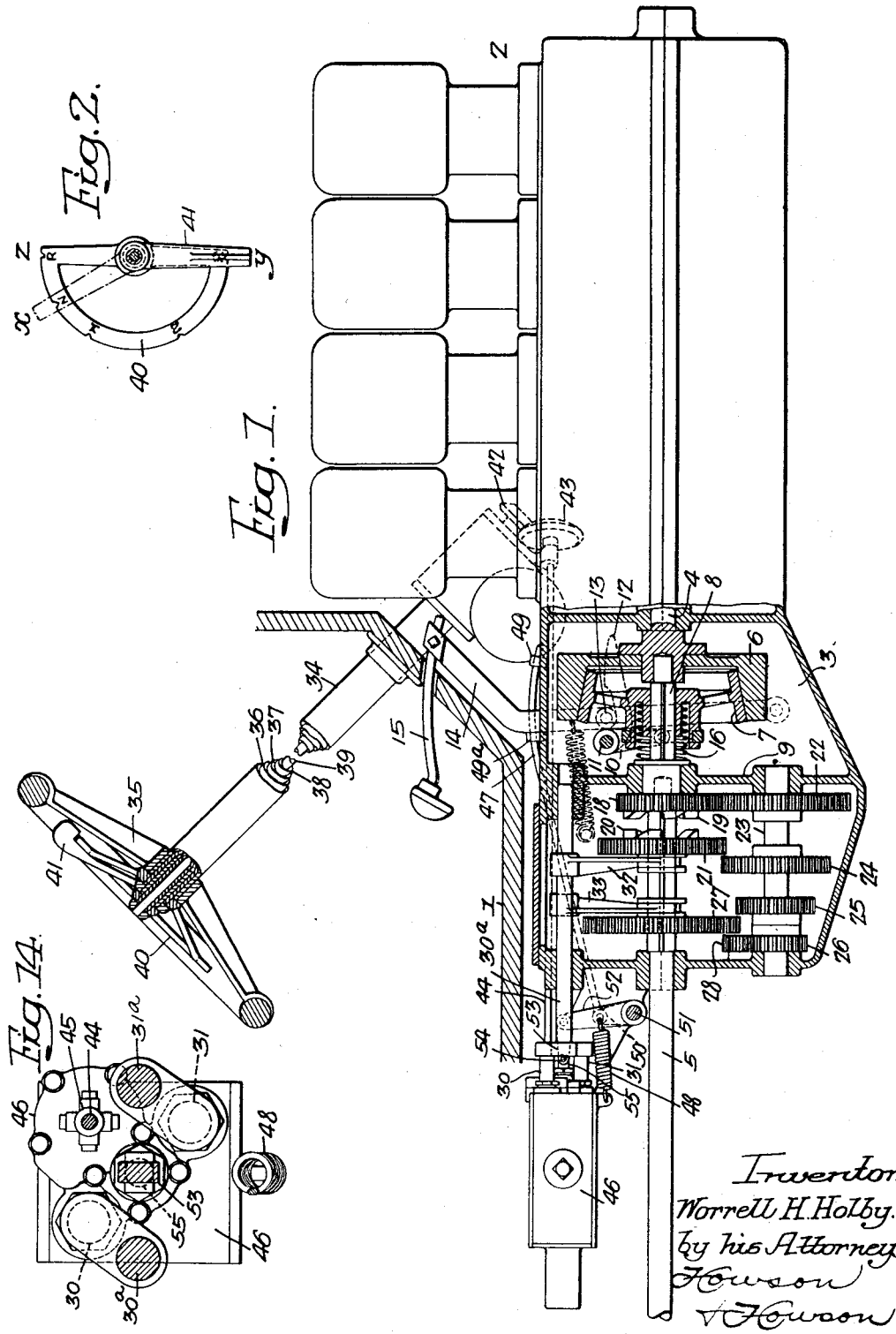

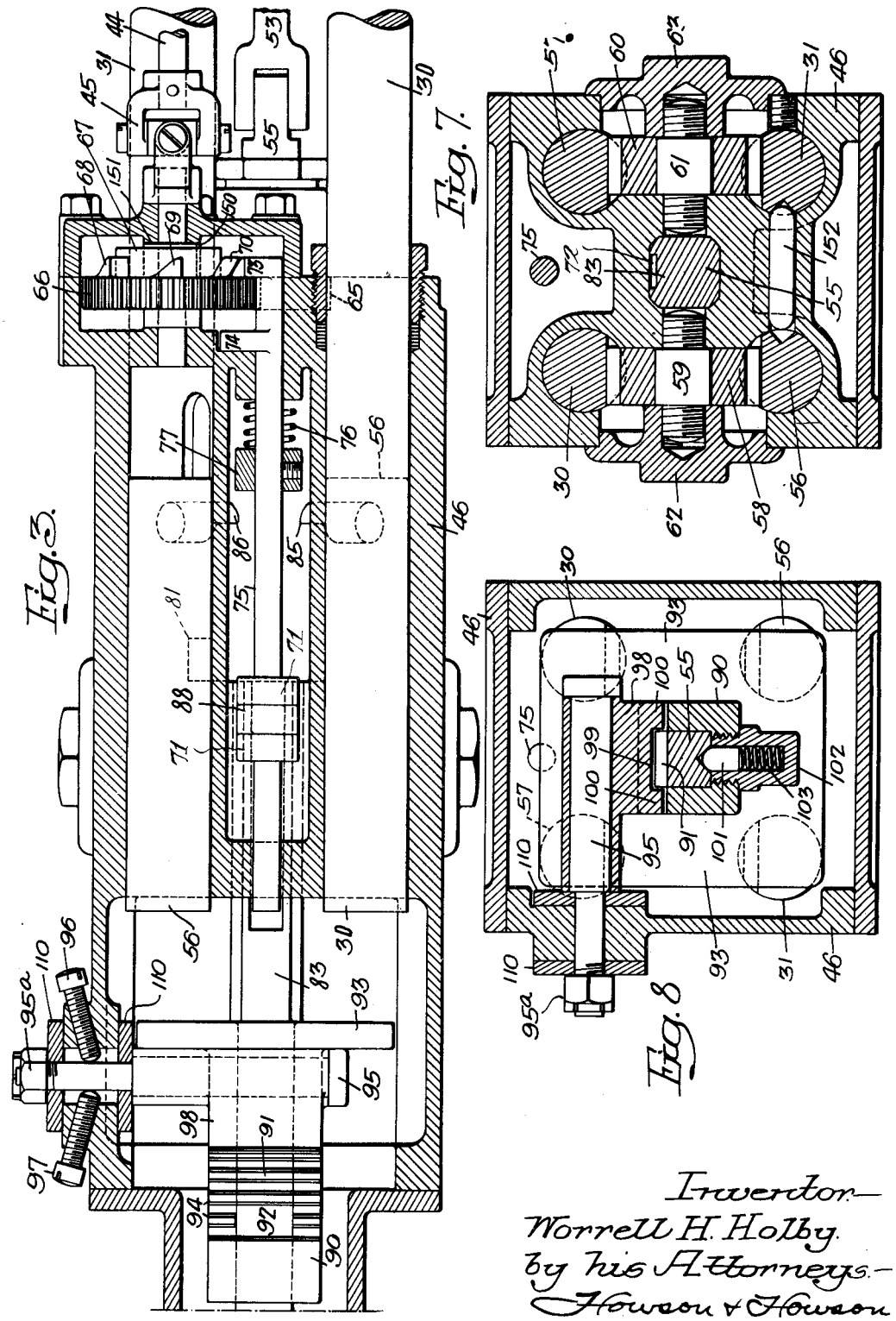

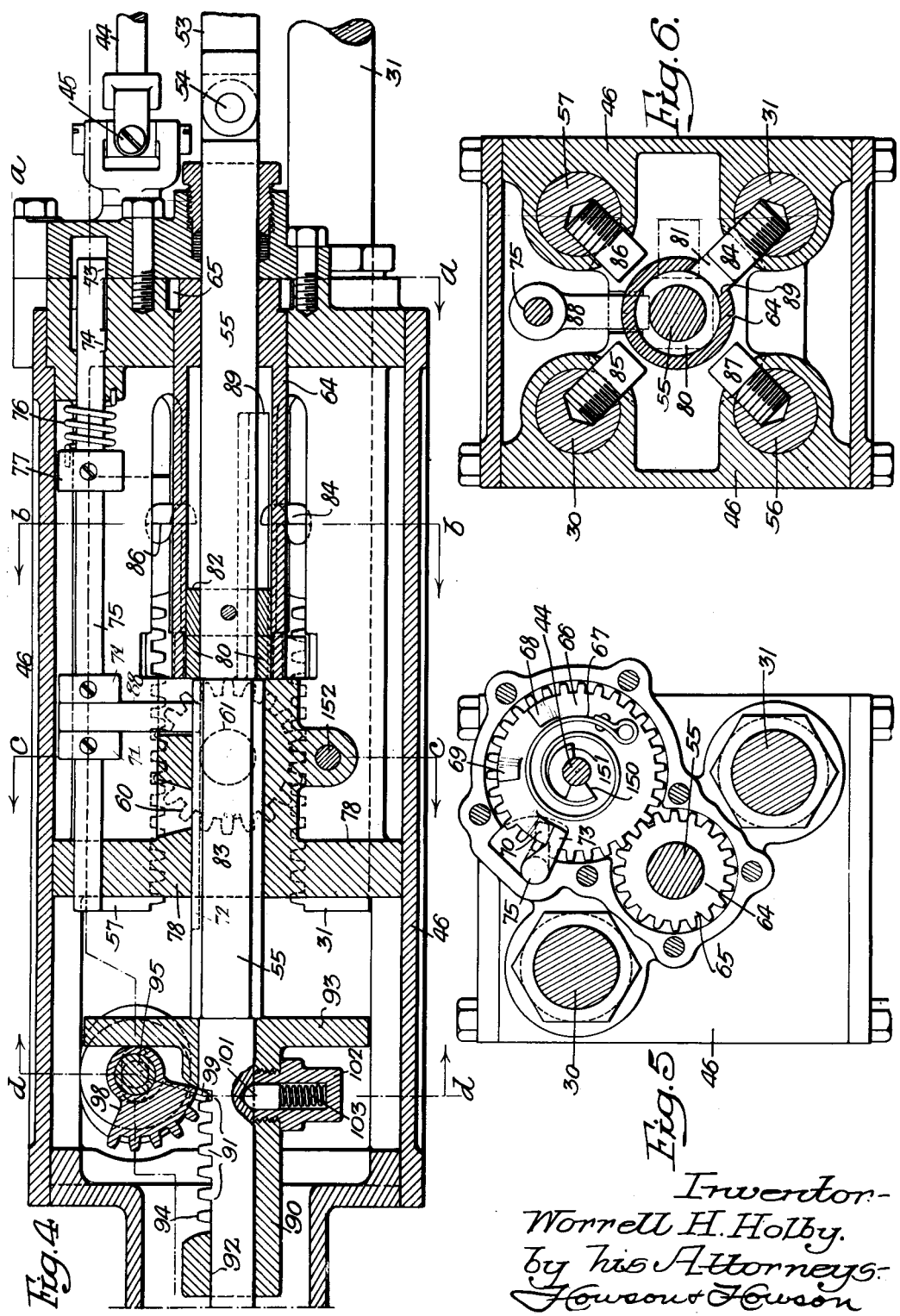

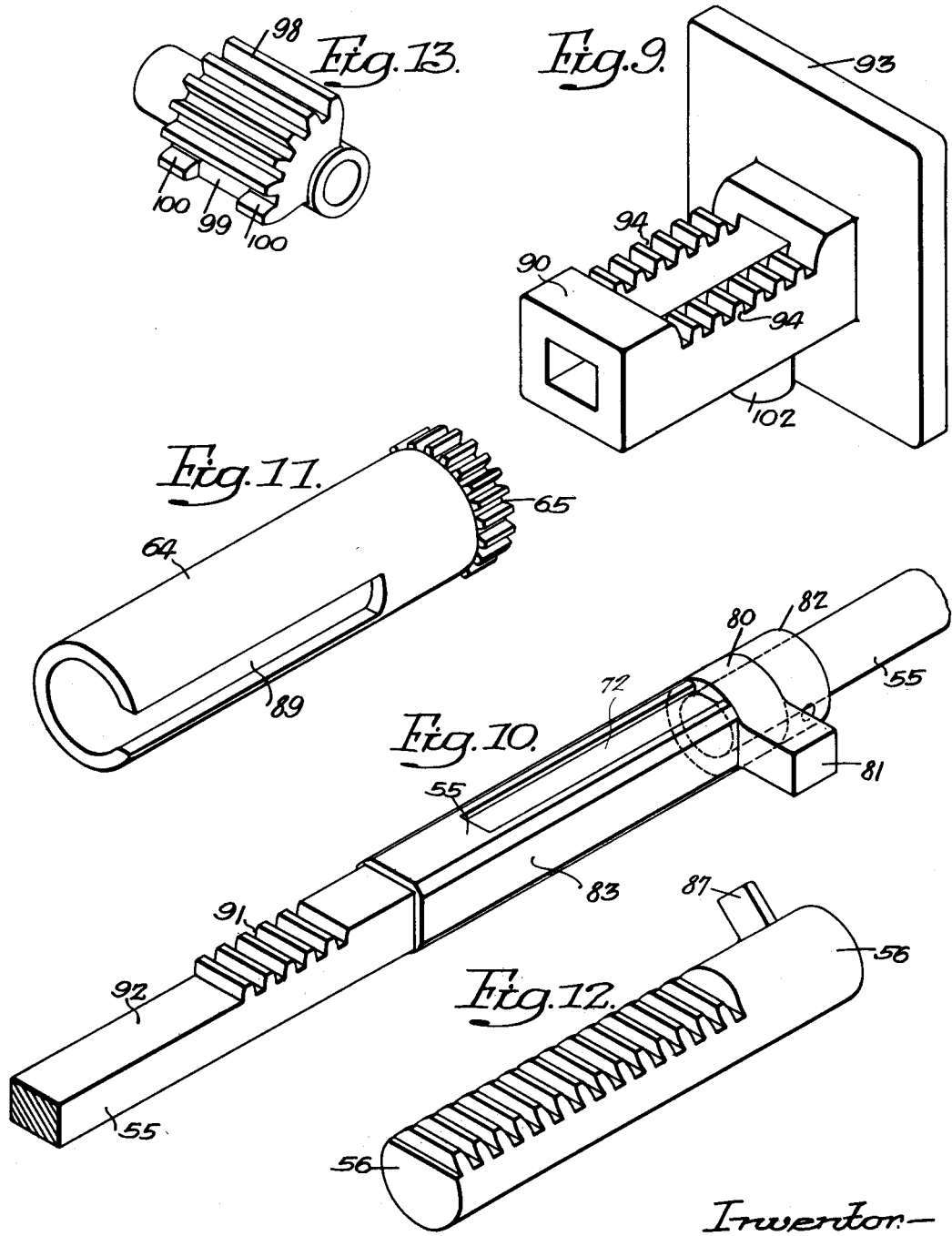

UNITED STATES PATENT OFFICE.

WORRELL H. HOLBY, OF PHILADELPHIA, PENNSYLVANIA, ASSIGNOR TO JOHN D. HOLBY, OF NEW YORK, N. Y.

MECHANICAL GEAR-SHIFT.

1,181,887. Specification of Letters Patent. Patented May 2, 1916.

Application filed August 18, 1915. Serial No. 46,186.

*To all whom it may concern:*

Be it known that I, WORRELL H. HOLBY, a citizen of the United States, residing in Philadelphia, Pennsylvania, have invented certain Improvements in Mechanical Gear-Shifts, of which the following is a specification.

One object of this invention is to provide a relatively simple, compact and substantial device for controlling and actuating a series of gears for the purpose of causing a driven shaft to be turned at any of a number of definite speeds from a driving shaft operating at a constant speed;—the invention being particularly adapted for use in connection with the speed controlling gears of a motor vehicle, and being designed to cause the main shaft to be driven from the engine shaft at any one of three speeds in a forward direction or at one speed in a reverse direction.

A further object of the invention is to provide a relatively simple and reliable form of gear selector mechanism especially designed to be controlled from the steering post of a motor vehicle, together with gear shifting mechanism operatively associated with the clutch controlling pedal or lever.

These objects and other advantageous ends I secure as hereinafter set forth, reference being had to the accompanying drawings, in which, Figure 1 is a side elevation partly in vertical section illustrating my invention as designed for controlling the speed change gearing of a motor vehicle; Fig. 2 is a plan of the selector segment and its associated lever; Figs. 3 and 4 are respectively a sectional plan and a sectional elevation taken longitudinally of the selector box shown in Fig. 1; Figs. 5 to 8 inclusive are transverse vertical sections taken respectively on the lines *a—a*, *b—b*, *c—c* and *d—d*, Fig. 4; Figs. 9 to 13 inclusive are perspective views of details of said invention; and Fig. 14 is an elevation partly in section illustrating one end of the selector casing.

In Fig. 1 of the above drawings 1 represents a portion of the body of a motor vehicle driven by an internal combustion engine 2 whose shaft 4 extends into a gear box 3 mounted immediately adjacent the engine crank case. In line with this shaft is the main driven shaft 5 whose speed is to be controlled by the mechanism constituting my invention. Within the casing 3 is the main clutch whose member 6 is fixed to the engine shaft while its member 7 is mounted on a third shaft 8, one end of which is journaled in the end of the shaft 4 and its other is carried in a bearing provided by a web or partition 9 extending across the casing 3. The clutch member 7 is free to slide on its shaft while being compelled to turn therewith and its position is controlled by a lever 10 mounted on a transverse spindle 11 to which is also fixed a second arm 12 having a cam surface engaged by a roller 13 on the pedal lever 14 which is supported in any suitable manner. To the upper end of this pedal lever is fixed the pedal 15 which extends into position to be engaged by the foot of the driver. The clutch member 7 is at all times pressed toward the member 6 by a spring 16 and is moved against the action of this spring, away from said latter member when the pedal 15 is depressed. Fixed to the clutch shaft 8 is a gear 18 having on one side a series of teeth 19 designed to directly engage a similar series of teeth 20 on the side of a second gear 21 slidably mounted on and forced to rotate with the shaft 5. As shown, the gear 18 is at all times in mesh with a gear 22 fixed to a counter shaft 23, mounted in suitable bearings in the case 3 and likewise having fixed to it gears 24, 25 and 26, of which the first is so placed as to engage the gear 21 when the latter is suitably moved on its shaft. Similarly the gear 25 may be directly coupled to the shaft 5 through a gear 27 which may also be slidably moved on said shaft into engagement with an idler gear 28 permanently engaged with the gear 26.

For shifting the gear 21 I provide a slidably mounted rod 30ª having an arm 32 engaging said gear, which in its neutral position lies in a position between the planes of the gears 22 and 24. By movement of this rod 30ª toward the right, the clutch teeth 19 are engaged with the clutch teeth 20, whereupon the shaft 5 is driven directly from the engine shaft 4. On the other hand, by moving the rod 30ª to the left the gear 21 is moved from its neutral position into mesh with the gear 24 so that the shaft 5 is driven from the engine shaft through gears 18 and 22, shaft 23 and gears 24 and 21.

A second slidably mounted rod 31ᵃ parallel with the rod 30ᵃ has projecting from it an arm 33 engaging the gear 27 which in its neutral or inoperative position lies between but disengaged from the gears 25 and 28. When said rod with its arm is moved to the right from the position shown in Fig. 1, the gear 27 is engaged with the gear 25 whereupon the main shaft 5 is driven from the engine shaft through gears 18 and 22, shaft 23 and gears 25 and 27. If said rod 31ᵃ be moved to the left, the gear 27 engages the gear 28 and the direction of rotation of the shaft 5 is reversed.

In order to move the rods 30ᵃ and 31ᵃ in the direction to make any of the above noted gear combinations and for the purpose of determining which of said combinations is to be put into operation, I provide gear shifting means operated from the clutch pedal 15 and select the combinations to be made when said pedal is actuated, by means of a controlling arm carried by the steering post. This latter is indicated at 34 and while it may have any desired construction, I have shown it as consisting of a sleeve to the upper end of which is keyed a steering wheel 35. Centrally mounted within this steering post are three tubular structures 36, 37 and 38 and within the innermost of these is a shaft or spindle 39. To the top of the sleeve 36, which itself is held from rotation in any suitable manner, I fix a semi-circular segment 40 and similarly fix to the sleeve 37 a selector arm 41 having a projecting lug designed to enter notches in the periphery of said segment 40 as shown in Fig. 2.

To the lower end of the sleeve 37 is fixed a beveled gear 42 meshing with a second beveled gear 43 fixed to a shaft 44 supported in suitable bearings and including a universal joint 45, Figs. 4 and 14, beyond which it extends into a selector casing 46.

The clutch operating lever 14 is designed to also actuate a rod 47 through a collar 49 fixed thereon in such position that said rod will be moved longitudinally to the right by said lever only after the clutch members 6 and 7 have been released, while its movement in the opposite direction will be caused by a spring 48. This rod 47, through an arm 50, a short shaft 51 and a second arm 52 is connected to a rod 53, which is coupled by a pin 54 to a longitudinally slidable rod 55 projecting into the selector casing 46 through a stuffing box.

The selector casing is elongated and preferably substantially rectangular in cross section, providing guideways for shift bars 30 and 31, as well as for two shorter shift bars 56 and 57, the two first of these bars being connected outside said casing to the bars 30ᵃ and 31ᵃ as shown in Fig. 14. The two bars 30 and 56 are operatively connected by a gear 58 suitably mounted to turn on a spindle 59 so as to engage toothed portions of the adjacent faces of said bars and similarly a gear 60 on a second spindle 61 meshes with suitably toothed portions of the bars 31 and 57. One end of each of said spindles is threaded into the casing structure 46 while their opposite ends are respectively threaded into caps 62 and 63 properly centered in openings in the side of said structure. As a consequence of this construction, movement in one direction of the bar 30 causes longitudinal movement of the bar 56 in the opposite direction and vice-versa, the same being true of the two bars 31 and 57.

Mounted concentrically with the rod 55 is a sleeve 64 (Figs. 4 and 11) having a toothed portion 65 forming a gear so placed as to mesh with a second gear 66 supported loosely on the inner end of the shaft 44. Said gear is operatively connected to said shaft through a spiral spring 67 whose outer end is attached to a post projecting from the gear and whose inner end is fixed to a lug 150 fixed to the shaft and normally engaged by a second lug 151 projecting from the gear so that independent movement of said gear and shaft is possible to a limited extent.

On the forward face of the gear 66 is a set of laterally projecting lugs or abutments, and a movement of rotation of the shaft 44 tends to turn the gear 66 through the lug 150, and the spiral spring 67. This turning is regulated by an arm 73 projecting from a slidable and rotatable rod 75 in such position that it may rest in the plane of rotation of said series of lugs on the gear 66. By means of a spring 76 acting on a collar 77 fixed to the rod 75, said rod is normally held in or tends to return to a position in which the arm 73 is in the plane of its set of lugs, and said rod 75, also under the action of this spring 76 normally tends to remain in or return to such a position that said arm occupies the position shown in dotted lines in Fig. 5, so as to be struck by the lug 70 on said gear 66. The opposite end of this rod is supported in a bearing in the transverse partition 78 of the selector casing and has rotatably mounted on it between two fixed collars 71 an arm 88 projecting into an elongated recess or slot 72 in the longitudinally slidable rod 55 as shown in Fig. 4. When said rod is sufficiently moved the end of this slot will engage said arm and so move the rod 75 as to withdraw the arm 73 from the plane of the lugs 68, 69 and 70.

The sleeve 64 is formed with a longitudinally extending slot 89 and has within it a ring 80 provided with a lug 81 projecting radially through said slot, being rotatable on the rod 55 between a fixed collar 82 and one end of a square section 83. This ring 80 is therefore free to slide within the sleeve 64 and is compelled to turn with it when said sleeve is rotated through its gear 65 by the gear 66. The shift bars 31, 30, 57 and 56 all lie at substantially the same distance from the shaft 55, with their axes in radial planes substantially 90° apart, and each of them has an inwardly projecting finger or lug indicated at 84, 85, 86 and 87, so placed and of such length that the lug or finger 81 of the collar 80 may be brought into line with it, the guideways in which said shifting bars are mounted having longitudinal slots to permit of the movement of their respective lugs under the action of said first lug. These slots in the guideways are of such length that while they receive the lug 81 and so prevent rotation of the sleeve 64 for the greater part of its travel, said lug is clear of them when the ring 80 is at the rear end of its possible path of movement, and the sleeve 64 is then free to be rotated.

The portion of the slidable rod 55 immediately to the rear of the squared part 83 has the form of a rack having teeth 91, to the rear of which said rod has a flat surface 92 at the level of the bottom of the teeth of said rack. The squared portion 83 is longitudinally slidable through a bearing provided by the partition 78 and the rear end of said rod slidably carries a sleeve 90 having an integral flange 93 forming a flat plate at its forward end. This flange or plate is of such dimensions as to be capable of engaging and under certain conditions, longitudinally moving the shift bars 30, 31, 56 and 57, (Fig. 8), it being noted that the extremity 92 of the rod 55 is preferably rectangular in section and is closely fitted in the rear end of the sleeve 90 so that the latter cannot turn relatively thereto. As shown in Fig. 9, a portion of the sleeve 90 is cut away to provide two edges in which are formed spur teeth 94 of the same depth and general form as the teeth 91 of the rod 55, with which under certain conditions they may be longitudinally alined.

Immediately above the sleeve 90 and the adjacent portions of the rod 55 is mounted a headed stud 95 extending transversely within the selector casing 46 and adjustable longitudinally thereof by means of two set screws 96 and 97. The outer end of this stud passes through a slot in the side of the casing and has threaded on it a nut 95ª which when set up serves to clamp two plates 110 respectively to the inside and outside surfaces of the casing 46 adjacent the slot. The stud, having a shoulder drawn by said nut against the inner plate 110, is thus clamped in any position to which it has been brought by the screws 96 and 97. On this stud 95 is rotatably mounted a toothed segment 98, the length of whose teeth is such that they are capable of meshing with the teeth 94 of the sleeve 90 as well as with the teeth 91 of the rod 55.

As shown in Fig. 13, one tooth of this segment is cut away as indicated at 99 for a length equal to the length of the teeth 91, so that when said segment is in a definite position the rod 55 may move longitudinally without affecting it or the sleeve 90, one pair of whose teeth is then engaged by the end portions 100 of this last segment tooth. In order to temporarily hold the rod 55 and the sleeve 90 in the relative positions indicated in Fig. 4, I provide a detent 101 carried in a cap 102 screwed into an opening in the under side of said sleeve and so acted on by a spring 103 as to at all times tend to remain in a slight cavity or depression of the rod 55.

Normally the various parts are in the positions shown in Figs. 3 and 4 and if it be assumed that the engine is in operation, the shaft 4, through the clutch members 6 and 7 idly drives the shaft 8, the gears 18 and 22, with the shaft 23. If now it be desired to drive the main shaft 5 in a forward direction at the highest possible speed, the selector arm 41 is turned in a counterclockwise direction from the position indicated in dotted lines in Fig. 2 to the position indicated in full lines at y over the notch marked "3". As a result the sleeve 37 is turned and through the gears 42, 43 and shaft 44, the lug 150 is caused to move away from the lug 151 and the spiral spring 67 is wound up or placed under tension, thereby turning the gear 66 until its first lug 70 engages the arm 73, which then moves to the position shown in full lines in Fig. 5. This partial rotation of said gear 66 likewise turns the gear 65 and the sleeve 64 together with the ring 80, until all of said parts come to rest when rotation of the gear 66 is stopped by the arm 73. By this operation the lug 81 of the ring 80 is moved from the position shown in dotted lines in Fig. 6, into the position shown in full lines, in which it is in alinement with the lug 84 of the shift bar 31. If now the clutch pedal 15 be depressed, the clutch member 7 is moved out of engagement with the clutch member 6 against the action of the spring 16 and thereafter the lever 14 is brought into engagement with the collar 49, thus longitudinally moving the rod 47 against the spring 48.

The rod 55 is consequently drawn out of the selector casing, thus moving forwardly the ring 80 with its lug 81 until the latter engages the lug 84, and as this outward movement of the rod 55 is continued, imparting an outward movement to the shift bar 31, which through the extension 31ᵃ moves the arm 33 and the gear 27 to the right, ultimately bringing said gear into mesh with the gear 25.

The release of the pedal 15 by the operator now allows the pedal lever 14 to return to the position shown in Fig. 1, thus permitting the clutch member 7 to engage the member 6, and transmitting power from the engine shaft through the clutch to the shaft 8, thence through gears 18 and 22, counter shaft 23 and gears 25 and 27 to the main shaft 5. At the same time the spring 48 acts to so move the rod 47 that the rod 55 is returned to its original position shown in Fig. 4. It is noted that the outward movement of the shift bar 31, through the medium of the gear 60 moves the shift bar 57 in a direction opposite to said bar, causing the former to project to the rear of the partition 78. When the rod 55 is moved out of the selector casing as above described the end of its slot 72 strikes the arm 88 just before this outward movement is completed, thus longitudinally moving the rod 75 to an extent sufficient to disengage its arm 73 from the lug 70. Immediately the lug 70 releases the arm 73 this latter turns under the action of the spring 76 into the position shown in dotted lines, and when by the rearward movement of the rod 55 the end wall of the slot 72 disengages the arm 88, said spring 76 expands sufficiently to return the rod 75 to its normal position with its arm 73 in the plane of the lug 69. The gear 66 however, cannot turn under the action of the spring 67 because the lug 81 lies within the guide slot for the lug 84 and so holds the sleeve 64 whose gear 65 meshes with said gear 66. When however, the lug 81 is returned to its rearmost position by the above noted rearward movement of rod 55, it is clear of said guide slot and the gear 66 is thus free to turn the sleeve 64 under the action of the spring 67 until said lug is in line with the lug 87 on the shift bar 56, at which point it is stopped and held by the engagement of the lug 69 with the escapement arm 73.

If the engine or apparatus driven by the shaft 5 has attained the necessary speed, another depression of the pedal 15 then acts to disconnect the clutch members 6 and 7 as before, and thereafter again moves the rods 47 and 55 outwardly; it being noted that as the ring 80 moves forward with said rod but before its lug 81 can engage with the lug 87, the sleeve 90 is likewise moved forward, and the segment 98, engaging the teeth 91 of rod 55 as well as the teeth 94, temporarily locks said rod and sleeve together. As a consequence the plate 93 strikes the rearwardly projecting end of the shift bar 57 and restores it with the shift bar 31 to their neutral positions, thus moving the gear 27 out of mesh with the gear 25. Immediately thereafter, however, the continued forward movement of the rod 55 brings its untoothed end 92 adjacent the segment 98 so that said rod is unlocked from the sleeve 90. The lug 81 then comes into contact with the lug 87 and as the rod 55 is drawn to its full outward position, the shift bar 56 is likewise moved out, thus moving the shift bar 30 to the rear through the gear 58. Such rearward movement of this bar brings the gear 21 into mesh with the gear 24 and through the plate 93 again moves to the rear the sleeve 90. As the pedal 15 is released, the clutch members 6 and 7 are again connected, so that power is transmitted from the engine shaft through gears 18, 22, 24 and 21, thus driving the main shaft 5 at its second speed.

As the clutch lever assumes its normal position, the rod 55 in moving to the rear under the action of the spring 48, completes the full rearward movement of the sleeve 90 and thereafter its teeth 91 move through said sleeve, owing to the fact that the segment 98 has been brought to a position in which its cutaway portion 99 allows free passage of said teeth. As before when the rod 55 is at the most forward part of its movement, the end of its slot 72 engages the arm 88 thus forcing the rod 75 forward and disengaging the arm 73 from the lug 69. Said arm again turns forwardly under the torsional action of the spring 76 so that when the rod 55 is returned to its rearmost position, the rod 75 is likewise moved rearwardly sufficiently to bring the arm 73 into the path of the lug 68. As soon therefore as the lug 81 is released from the slot through which the lug 87 projects, the spring 67 is free to again move the gears 66 and 65 with the sleeve 64 until the lug 81 is brought into line with the lug 85 of the shift bar 30, in which position it is held by the engagement of the lug 68 with the arm 73.

The third depression of the pedal 15 again disengages the clutch members 6 and 7 and by moving outwardly the rod 55, first of all moves forwardly the sleeve 90 and its plate 93, thus causing said plate to engage the rearwardly extending end of the shift bar 30 and return it with the bar 56 to their neutral positions. By the time this has been accomplished the segment 98 has been so far turned as to be disengaged from the teeth 91 of the rod 55 so that the continued forward motion of this latter moves the rod 30 forwardly from its neutral position, and through the rod 57, moves the sleeve 90 to the rear. These successive forward movements of the shift bar 30 first disengages the gear 21 from the gear 24 and thereafter bring the teeth 20 on the face of said first gear into direct engagement with the teeth 19 on the gear 18. The subsequent release of the clutch pedal 15 permits the engagement of the clutch members 6 and 7 and causes the main shaft 5 to be driven directly from the engine shaft through the intermediate shaft 8. The final movement to the rear of the rod 55 as the clutch lever 14 assumes its normal position, as before completes the final rearward movement of the sleeve 90. In order to prevent the unintentional movement of one pair of the bars 30—56 or 31—57 when the other pair is out of the neutral position, I mount a locking pin 152 (Fig. 7) in a recess in the casing structure 46 and provide depressions in the adjacent bars 31 and 56 placed to be in line with said pin when said bars are in their neutral positions. The length of said pin is such that if one of said bars is moved from its neutral position, the pin is moved longitudinally into the depression of the other bar, thus preventing the possibility of its movement until the first shifted bar is again returned to the neutral position.

A return of the selector lever 41 to its neutral position $x$, through the sleeve 37, gears 42 and 43, shaft 44, causes the lug 150 to act on the lug 151 which has come into engagement with it, thus turning the gear 66 in a clockwise direction, and causing the shaft 75 to turn against the action of the spring 76 to allow the several lugs 68, 69 and 70 to pass the arm 73 of said shaft. After the last of these lugs has moved beyond said arm, the spring 76 returns it to such position that it is again ready to be engaged by the lug 70. This turning of the gear with the sleeve 64 and ring 80 continues until when the selector lever 41 is in its neutral position, the lug 81 occupies the position shown in dotted lines in Fig. 6.

If the selector lever 41 is moved from the neutral position shown at $x$, Fig. 2, to the position indicated at $z$ over the letter R, in Fig. 2, the resulting turning of the shaft 44 and lug 150 positively turns the gear 66 with the sleeve 64 to a position in which the lug 81 is in line with the lug 86 of the shift bar 57. The subsequent depression of the pedal 15 then causes the rod 55 to be moved outwardly after the clutch members 6 and 7 have been disconnected and brings said lug 81 into engagement with the lug 86 so that the shift bar 57 is moved outwardly, thus moving to the rear the shift bar 31. Such rearward movement, through the bar 31ª and arm 33, moves the gear 27 into engagement with the gear 28 so that when the clutch members 6 and 7 are again engaged, the main shaft 5 is turned in a direction opposite to that of the engine shaft 4.

If while the main shaft 5 is being driven in either direction, the selector lever 41 be moved to its neutral position, the subsequent depression of the pedal 15, after disconnecting the clutch members 6 and 7, by moving the rod 55 forward, will restore to its neutral position that one of the shift bars which is displaced and will consequently likewise return to their neutral positions the corresponding parts attached to that bar. In the case of the reverse position, the movement of the selector lever to neutral puts the spring 67 under stress, causing the gear 66 and its connected mechanism to be turned until when further turning is prevented by lug 151 striking lug 150, the lug 81 is in its neutral position.

From the foregoing description it will be appreciated that by operating a selector lever on the steering post, the selector mechanism is so actuated that one or more operations of the clutch controlling lever effects the desired combinations of gearing necessary to cause the driven shaft to be turned at the speed desired, the arrangement of parts being such that there is no possibility of the gearing being shifted at the wrong time or in the wrong manner, since the escapement mechanism associated with the gear 66 determines with certainty the order in which the combinations of gearing can occur and sets the parts in the proper positions for their actuation by the clutch operating lever. The locking pin 152 also effectually prevents the accidental movement of that part of the apparatus which should properly remain inactive at any particular time.

It is to be noted that with the above described arrangement of parts the selector lever may be set at any of several positions corresponding to definite gear combinations and thereafter the escapement mechanism comprised by the gear 66, the shaft 75 and their associated parts and controlled by said lever, causes one or more combinations of the gearing to be made when the clutch controlling lever is operated in the ordinary manner for a number of times depending on the combination ultimately desired.

With the above described arrangement of parts this invention operates progressively from low to high speed and either selectively or progressively from high to low speed. When thus operating selectively from high to low or any other speed than high, the selector arm 41 would be moved from the position shown in full lines in Fig. 2 to a position adjacent the numeral 1, for example, which indicates the first speed, and as a result the shaft 44 and lug 150 would be brought to a definite position. Owing to the engagement of said lug with the lug 151 on the gear 66, this latter gear 65 and sleeve 64 are so turned without interference from the arm 73 as to turn the ring 80 into such position that the lug 81 is brought into line with the lug 84 of the shift bar 31 so that if the clutch pedal 15 be depressed, the various parts are actuated as previously described to make the gear combinations corresponding to the first speed. Obviously the mere omission of the rod 75 and its arms 73 and 88 will, without further change of the apparatus, permit it to be used selectively in changing from low speed to any higher speed, since under these conditions there is nothing to prevent the sleeve 64 and lug 81 actuated thereby from being moved by the selector arm 41 from any position to any other position and the subsequent shifting of the gearing to cause a corresponding speed of the driven shaft, without requiring the device to operate progressively through the intermediate speeds.

I claim:—

1. The combination of a plurality of speed changing members; a single device for operating the same; selector mechanism for determining the particular one of said members to be actuated by said device; and an escapement for governing the operation of the selector mechanism.

2. The combination of a plurality of speed changing members; a single device capable of operating any of said members; selector mechanism for determining which of the members is to be actuated; and an escapement for causing the members to be actuated in a definite order.

3. The combination of a plurality of speed changing members; a clutch controlling device connected to actuate any of said members; mechanism for determining which of said members shall be actuated by said device; and means for causing the members to be actuated in a predetermined order.

4. The combination of a plurality of speed changing members; a single device for successively actuating said members; a selector for determining which of said members is to be actuated, including a power storing element; with mechanism for causing operation of said element after each operation of said device.

5. The combination of a series of speed changing members; a single actuating device therefor; selector mechanism for causing said actuating device to be brought into operative relation with predetermined ones of said members; and means for operating said device when it has been brought into such operative relation, said selector mechanism including means for automatically determining the order in which said members shall be operated.

6. The combination of a series of speed changing members; a single actuating device therefor; selector mechanism for causing said actuating device to be brought into operative relation with predetermined ones of said members; and means for actuating said device when it has been brought into such operative relation, said mechanism including yielding means permitting it to be primarily set and thereafter causing intermittent operation of said element.

7. The combination of a plurality of shift bars; a single member mounted to be capable of operating any one of said bars; and selector mechanism for bringing said member into operative relation with any one of said bars, said mechanism including automatically acting means for determining the number of said bars with which said member is to be engaged.

8. The combination of a plurality of gear shift bars; an actuating member mounted substantially equidistant from said bars and including a rotary structure adjustable to couple said member and any one of said bars; means for operating the member to move the bar for which its structure is adjusted; and means for automatically causing a succession of rotary movements of said structure to bring it into coupling relation with a predetermined shift bar.

9. The combination of a plurality of speed changing members; an operating member including an element adjustable into position to couple it to any one of said speed changing members; and a selector for causing rotation of said element into any of a plurality of coupling positions, the same including a spring put under stress when the selector is set; with a device for subsequently governing the operation of said element by said spring.

10. The combination of a plurality of speed changing members; an actuating member therefor including an element adjustable to couple it with any of said first members; and selector mechanism for rotating said element into any of its coupling positions, the same including a spring placed under stress when the selector is set; and an escapement for permitting rotation of said element under the action of said spring after each operation of the actuating member.

11. The combination of a plurality of speed changing members; a clutch operated actuating member; a rotary element for connecting said actuating member to any of the speed changing members; a spring; a selector lever for placing the spring under stress; with escapement mechanism for controlling the operation of the spring, the same consisting of a series of projections; and a holding member successively disengaged from said projections to allow intermittent rotation of the element.

12. The combination of a plurality of speed changing members; a longitudinally movable rod; a rotary element adjustable independently of said rod into coupling relation with any of said members; selector mechanism for operating said element; and means for longitudinally moving said rod at will to actuate the members.

13. The combination of a plurality of longitudinally movable change speed bars; means for operating any one of said bars at will; and a neutralizing plate movable in a line parallel to the line of movement of the bars, and gearing actuated by said means for returning to its normal position any displaced bar before another bar is operated.

14. The combination of a plurality of longitudinally movable speed change bars; means for operating any one of said bars at will; and mechanism actuated by said means for returning to its normal position any displaced bar before another bar is operated, the same including a member reciprocable in a line parallel to the line of movement of said bars, while said operating means is being moved in one direction.

15. The combination of a plurality of longitudinally movable speed change bars; a member for operating any one of said bars at will; a device actuated by said member for returning to its normal position any displaced bar before another bar is operated, the same including a plate capable of actuating any of the bars and movable in the line of movement thereof; with mechanism for reciprocating said plate while the operating member is being moved in one direction.

16. The combination of a plurality of speed change bars; a member for operating any one of said bars at will; a bar neutralizing member; and gearing detachably connected to the operating member for causing the neutralizing member to restore to its normal position any displaced bar before another bar is operated.

17. The combination of a plurality of speed change bars; a member for operating any one of said bars at will; a bar neutralizing member; and means connected to the operating member for causing the neutralizing member to restore to its normal position any displaced bar before another bar is operated, the same including a structure detachably connected to the operating member for a part only of its movement in one direction.

18. The combination of a plurality of speed change bars; a member for operating any one of said bars at will; a bar neutralizing member; with means connected to the operating member for causing the neutralizing member to restore to its normal position any displaced bar before another bar is operated; the same consisting of teeth on the operating and neutralizing members respectively; and a toothed member capable of engaging with both of said sets of teeth.

19. The combination of a plurality of speed change bars; a member for operating any one of said bars at will; a bar neutralizing member; means connected to the operating member for causing the neutralizing member to restore to its normal position any displaced bar before another bar is operated; the same consisting of teeth on the operating and neutralizing members respectively with a toothed structure capable of engaging both of said sets of teeth and formed to permit of independent movement of said latter members after it has locked them together for a predetermined movement.

20. The combination of a plurality of speed change bars; a member for actuating any of said bars at will; a plate mounted to engage any of the bars and having a series of teeth; a series of teeth on the actuating member; and a toothed segment engaging said two series of teeth to temporarily lock together the plate and the actuating member.

21. The combination of a plurality of speed change bars; a member for actuating any of said bars at will; a plate mounted to engage any of the bars and having a series of teeth; a series of teeth on the actuating member; and a toothed segment mounted to temporarily lock together said two series of teeth for a part of the movement of the actuating member, the latter being movable independently of the plate for another part of its movement.

22. The combination of a plurality of speed change bars; a member for actuating any of said bars at will; a plate mounted to engage any of the bars and having a series of teeth; a series of teeth on the actuating member; and a toothed segment mounted to temporarily lock together said sets of teeth; said actuating member including an untoothed portion placed to permit of its operation independently of the plate.

23. The combination of a plurality of speed change bars; a common operating member therefor; means for connecting any one of said bars to said member at will; a sleeve slidable on said member and having a portion placed to engage any of the bars when it is out of its normal position; a series of teeth on the sleeve; a second series of teeth on the operating member; with a segment placed to simultaneously engage both sets of teeth and having a cutaway portion placed to permit of independent movement of the operating member and sleeve.

24. The combination of a plurality of speed change bars; a common operating member therefor; means for connecting any one of said bars to said member at will; a sleeve slidable on said member and having a portion placed to engage any of the bars when it is out of its normal position; a series of teeth on the sleeve; a second series of teeth on the operating member; with a segment placed to simultaneously engage both sets of teeth and having a cutaway portion placed to permit of independent movement of the operating member and sleeve; and said segment and sleeve being movable independently of the operating member.

25. The combination of a plurality of change speed bars having toothed portions; a gear engaging said toothed portions; and a longitudinally movable operating member having means for connecting it to either of said bars at will, said means including a device whereby such connection is made during a part only of the stroke of the operating member in one direction.

26. The combination of a plurality of change speed bars having toothed portions; a gear engaging said toothed portions; with a longitudinally movable operating member having means for connecting it to either of said bars at will and including a device whereby such any displaced bar is moved to its neutral position by the first part of the movement of the operating member in a direction to actuate another of the bars.

27. The combination of a plurality of change speed bars having toothed portions; a gear engaging said toothed portions; a longitudinally movable operating member having means for connecting it to either of said bars at will, including a device whereby such connection is made during a part only of the stroke of said operating member in one direction; with a device for restoring one of said bars to its normal position during that part of the stroke of the operating member in which it is operatively disconnected from the other bar.

28. The combination of a plurality of change speed bars having toothed portions; a gear engaging said toothed portions; a longitudinally movable operating member; means for connecting said member to either of said bars at will and including a device whereby such connection is made during a part only of the stroke of the operating member in one direction; with a device for restoring one of said bars to its normal position during that part of the stroke of the operating member in which the latter is operatively disconnected from the other bar; the same consisting of a plate moved by the operating member into engagement with the displaced bar and operatively disconnected from said member when the latter is shifting the other bar.

29. The combination of a steering post; change speed mechanism; a clutch connecting said mechanism to a source of power; a clutch operating member; mechanism for causing the operation of the change speed mechanism in a predetermined succession of speed changes; a selector lever on said steering post for controlling the selector mechanism; and means connected to the clutch operating member for operating the change speed mechanism after the selector mechanism has been set by said lever.

30. The combination of change speed mechanism; and selector mechanism for controlling the same, the latter including a single operating member; a plurality of shift bars mounted around the same; a lug on the member; with means for adjusting the member to bring its lug into position to longitudinally move any one of the bars; and a device for preventing disengagement of said lug and any bar temporarily connected thereto, after the operating member has been moved from its off position.

31. The combination of change speed mechanism; and selector mechanism for controlling the same, the latter including a single operating member; a plurality of shift bars mounted around the same and each having a lug projecting toward said member; a lug on the member; with means for adjusting the member to turn it into line with any one of the bar carried lugs, and means for preventing disengagement of the lug on said member from any of said latter lugs except when the parts are in their neutral positions.

32. The combination of change speed mechanism; and selector mechanism for controlling the same, the latter including a single operating member; a plurality of shift bars mounted around the same and each having a lug projecting toward said member; a lug on the member; means for adjusting the latter lug to turn it into line with any one of the bar carried lugs; with a device for causing the first lug to be automatically moved into engagement with a succession of the bar carried lugs.

33. The combination in a selector of a plurality of shift bars; a speed changing member; a structure longitudinally movable with said member but rotatable thereon into position to engage any of the shift bars; a controlling device for the selector; and a power transmission mechanism connecting the device with the rotatable structure.

34. The combination in a selector of a plurality of shift bars; a speed changing member; a structure longitudinally movable with said member but rotatable thereon into position to actuate any of the shift bars; a controlling device for the selector; and power transmitting mechanism connecting said device with the rotatable structure; the same including a shaft; a rotary member; a spring connecting the shaft and the rotary member; and means for governing the operation of said spring.

35. The combination of a plurality of shift bars; a supporting structure therefor having guideways; an operating member for the shift bars; a structure rotatable on the operating member and movable longitudinally therewith; a projection from said structure capable of operating in any of the guideways to actuate the bar adjacent thereto; and manually controlled means for rotating the structure to turn its projection into line with any of the guideways.

36. The combination of a plurality of shift bars; a supporting structure therefor having guideways; an operating member for the shift bars; a structure rotatable on the operating member and movable longitudinally therewith; a projection from said structure capable of operating in any of the guideways to actuate the bar adjacent thereto; and manually controlled means for rotating the structure to turn its projection into line with any of the guideways; the same including a manually operated member; a spring interposed between said member and said structure for permitting setting of the member without corresponding full movement of said structure; and mechanism for controlling the operation of the spring.

WORRELL H. HOLBY.